United States Patent
Iseki et al.

(10) Patent No.: US 7,473,747 B2
(45) Date of Patent: Jan. 6, 2009

(54) ETHYLENE-α-OLEFIN COPOLYMER AND MOLDING THEREOF

(75) Inventors: Yuki Iseki, Scarsdale, NY (US); Katsuhiro Yamada, Ichihara (JP); Yasutoyo Kawashima, Ichihara (JP); Yoshinobu Nozue, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/528,473

(22) Filed: Sep. 28, 2006

(65) Prior Publication Data

US 2007/0100106 A1    May 3, 2007

(30) Foreign Application Priority Data

Sep. 30, 2005 (JP) ............................. 2005-286850
Mar. 31, 2006 (JP) ............................. 2006-097935
Jul. 4, 2006 (JP) ............................. 2006-184249

(51) Int. Cl.
*C08F 4/42* (2006.01)

(52) U.S. Cl. .................... 526/160; 526/348.6; 526/348; 526/943; 526/130

(58) Field of Classification Search ............. 526/348.6, 526/348, 160, 943, 130
See application file for complete search history.

(56) References Cited

U.S. PATENT DOCUMENTS

2004/0030082 A1 *   2/2004   Iseki ...................... 526/348.2

\* cited by examiner

*Primary Examiner*—Ling-Siu Choi
(74) *Attorney, Agent, or Firm*—Birch, Stewart, Kolasch & Birch, LLP

(57) ABSTRACT

An ethylene-α-olefin copolymer containing monomer units derived from ethylene and monomer units derived from an α-olefin having 4 to 20 carbon atoms, and having a density of 890 to 970 kg/m$^3$, an activation energy of flow of 50 kJ/mol or more, a molecular weight distribution of 3 or more determined by a gel permeation chromatography, and the number of inflection points of 3 or less on a melting curve obtained by a differential scanning calorimetry within a temperatures ranges of from 25°C. to an end point of melting.

6 Claims, No Drawings

ETHYLENE-α-OLEFIN COPOLYMER AND MOLDING THEREOF

BACKGROUND OF THE INVENTION

1. Field of the Invention

The invention relates to an ethylene-α-olefin copolymer and a molding thereof.

2. Description of the Prior Art

For films, sheets, and tubes used for packaging foods and non-food materials, moldings molded by extruding ethylene-α-olefin copolymers are broadly used. The ethylene-α-olefin copolymers used for such moldings require an excellent moldability such as low extrusion load and stability in processing. As such ethylene-α-olefin copolymers, disclosed is an ethylene-1-butene copolymer produced by copolymerizing ethylene and 1-butene with a catalyst which is formed by adding triisobutylaluminum to silica, further adding an organic aluminumoxy compound, and then reacting with bis(indenyl) ethane, n-butyllithium and zirconium tetrachloride (e.g. JP04-213309 A). Further, polymers produced by copolymerizing ethylene and an α-olefin with a catalyst which is formed by subjecting triisobutylaluminum and racemi-ethylenebis(1-indenyl) zirconium diphenoxide to a contact treatment and then further subjecting to a contact treatment with a co-catalyst support (e.g. JP2004-149760 A, JP2005-97481 A).

SUMMARY OF THE INVENTION

The ethylene-α-olefin copolymers mentioned above, however, didn't satisfy an expected heat shrinkability due to their low heat shrinkage ratio or high heat shrinkage temperature when being used for moldings requiring heat shrinkability such as shrinkable films or heat shrinkable tubes.

Under this circumstance, an object of the present invention is to provide an ethylene-α-olefin copolymer having a favorable moldability as well as being obtainable a molding having an excellent heat shrinkability, and a molding thereof.

The first aspect of the present invention is an ethylene-α-olefin copolymer containing monomer units derived from ethylene and monomer units derived from an α-olefin having 4 to 20 carbon atoms and having a density (d) of 890 to 970 kg/m$^3$, an activation energy of flow (Ea) of 50 kJ/mol or more, a molecular weight distribution (Mw/Mn) of 3 or more determined by a gel permeation chromatography, and the number of inflection points of 3 or less on a melting curve within temperature range from 25° C. to an end point of melting obtained by a differential scanning calorimetry.

The second aspect of the present invention is an ethylene-α-olefin copolymer having monomer units derived from ethylene and monomer units derived from an α-olefin having 4 to 20 carbon atoms, a density (d) of 890 to 970 kg/m$^3$, an activation energy of flow (Ea) of 50 kJ/mol or more and a molecular weight distribution (Mw/Mn) of 3 or more determined by a gel permeation chromatography, wherein a maximum melting point (Tm) thereof determined by a differential scanning calorimetry and the density (d) satisfy a relation represented by the following formula (1):

$$0.675 \times d - 515.5 \leq Tm \leq 0.775 \times d - 601 \qquad (1).$$

The third aspect of the present invention is a molding produced by molding the ethylene-α-olefin copolymer mentioned above.

DETAILED DESCRIPTION OF THE INVENTION

The ethylene-α-olefin copolymer of the present invention is an ethylene-α-olefin copolymer having monomer units derived from ethylene and monomer units derived from an α-olefin having 4 to 20 carbon atoms. Examples of the α-olefin include 1-butene, 1-pentene, 1-hexene, 1-heptene, 1-octene, 1-nonene, 1-decene, 1-dodecen, 4-methyl-1-pentene, and 4-methyl-1-hexene, and they may be used alone or in a combination of two or more kinds thereof. The α-olefin is preferably 1-hexene, 4-methyl-1-pentene, or 1-octene, and more preferably 1-hexene.

An amount of the monomer units derived from ethylene contained in the ethylene-α-olefin copolymer is usually 50 to 99.5% by weight based on the total weight (100% weight) of the ethylene-α-olefin copolymer. An amount of the monomer units derived from the α-olefin contained is usually 0.5 to 50% by weight based on the total weight (100% weight) of the ethylene-α-olefin copolymer.

Besides monomer units derived from ethylene and monomer units derived from the α-olefin, the ethylene-α-olefin copolymer of the present invention may include monomer units derived from another monomer as long as not violating effects of the present invention. Examples of the monomer units derived from the other monomer include, for example, conjugated dienes (e.g. butadiene, isoprene), non-conjugated dienes (e.g. 1,4-pentadiene), acrylic acids, acrylic esters (e.g. methyl acrylate, ethyl acrylate), methacrylic acids, methacrylic acid esters (e.g. methyl methacrylate, ethyl methacrylate), and vinyl acetate.

The ethylene-α-olefin copolymer of the present invention is preferably a copolymer having a monomer units derived from ethylene and monomer units derived from the α-olefin having 5 to 10 carbon atoms, more preferably 6 to 10 carbon atoms. The α-olefin mentioned above is preferably a linear α-olefin.

The ethylene-α-olefin copolymer of the present invention includes, for example, ethylene-1-hexene copolymer, ethylene-1-octene copolymer, ethylene-1-butene-1-hexene copolymer, ethylene-1-butene-4-methyl-1-pentene copolymer, and ethylene-1-butene-1-octene copolymer; preferably ethylene-1-hexene copolymer, ethylene-1-butene-1-hexene copolymer, and ethylene-1-butene-4-methyl-1-pentene copolymer; and more preferably ethylene-1-hexene copolymer and ethylene-1-butene-1-hexene copolymer.

The melt flow rate (MFR; unit is g/10 minutes) of the ethylene-α-olefin copolymer is usually 0.01 to 100 g/10 minutes. The melt flow rate, from the viewpoint of enhancing moldability, especially reducing extrusion load, is preferably 0.05 g/10 minutes or more, and more preferably 0.1 g/10 minutes or more; and, on the other hand, from the viewpoint of enhancing melt tension and mechanical strength of moldings, being preferably 20 g/10 minutes or less, and more preferably 10 g/10 minutes or less. The MFR is determined with the A method coded in JIS K7210-1995 under conditions of a temperature of 190° C. and a load of 21.18 N. In the MFR measurement, usually used is an ethylene-α-olefin copolymer blended in advance with about 1000 ppm of an antioxidant.

The density (d; unit is kg/m$^3$) of the ethylene-α-olefin copolymer is usually 890 to 970 kg/m$^3$; and in view of enhancing rigidity of moldings and reducing distortion of moldings due to being loaded, preferably 900 kg/m$^3$ or more, more preferably 905 kg/m³ or more, and even more preferably 910 kg/m³ or more; and in view of lowering heat shrinkage temperature and impact strength, being preferably 940 kg/m³ or less, and more preferably 930 kg/m³ or less. The density is measured according to A method in JIS K7112-1980 after annealed according to JIS K6760-1995.

The ethylene-α-olefin copolymer is an ethylene-α-olefin copolymer having long chain branches and being superior in moldability, and such ethylene-α-olefin copolymer has a higher activation energy of flow (Ea; unit is kJ/mol) than conventionally known linear ethylene-α-olefin copolymers. The conventionally known linear ethylene-α-olefin copolymers have an Ea value of lower than 50 kJ/mol, thereby sometimes to have disadvantages such as unsatisfied moldability, especially in an extrusion load.

The Ea value of the ethylene-α-olefin copolymer is, from the viewpoint of enhancing moldability, especially lowering extrusion load without over-deterioration of the melt tension, is preferably 55 kJ/mol or more, and more preferably 60 kJ/mol or more; and in view of enhancing gloss of moldings, Ea is preferably 100 kJ/mol or less, and more preferably 90 kJ/mol or less.

The activation energy of flow (Ea) is a value calculated according to the Arrhenius equation with a shift factor ($a_T$), the shift factor ($a_T$) being defined while preparing a master curve of melt complex viscosity (unit is Pa·sec) at 190° C. depending on angular frequency (unit is rad/sec) according to the time-temperature superposition principle, and the value of Ea is determined by the following procedure:

Preparing melt complex viscosity-angular frequency curves (melt complex viscosity is expressed in Pa·sec, angular frequency is expressed in rad/sec) of an ethylene-α-olefin copolymer at temperatures (T, expressed in ° C.) of 130° C., 150° C., 170° C., and 190° C. respectively, shifting the melting complex viscosity-angular frequency curves obtained at respective temperatures (T) to respectively superpose on the melt complex viscosity-angular frequency curve of the ethylene-based copolymer at 190° C. according to the time-temperature superposition principle, thus obtaining the shift factors ($a_T$) the respective temperatures which represent an extent of shifting each curve for the above superposition, calculating a value of [ln($a_T$)] with the shift factors ($a_T$) at the respective temperatures and that of [1/(T+273.16)] with the respective temperatures; and then determining a linear approximation equation (the formula (I) represented below) correlating the above calculated values according to the least-squares method; thereafter, Ea is determined by combining a value of slope m of the linear approximation equation and the formula (II) represented below:

$$ln(a_T) = m(1/(T+273.16)) + n \quad (I),$$

$$Ea = |0.008314 \times m| \quad (II),$$

$a_T$: Shift factor,
Ea: Activation energy of flow (expressed in kJ/mol),
T: Temperature (expressed in ° C.).

The above calculation may be carried out with using a commercially available calculation software, which includes Rhios V.4.4.4 manufactured by Rheometrics.

The shift factor ($a_T$) represents the extent of shifting each of the melting complex viscosity-angular frequency curves obtained at respective temperatures, wherein each of the curves plotted on a double logarithmic chart is shifted in the direction of log(Y)=−log(X) (wherein y-axis represents melt complex viscosity and x-axis represents angular frequency) to superpose on the melting complex viscosity-angular frequency curve at 190° C., and each of the double logarithmic melt complex viscosity-angular frequency curves is superposed by shifting in amounts of $a_T$ times angular frequency and 1/$a_T$ times melting complex viscosity. For determining the formula (I) depending on the values obtained at 130° C., 150° C., 170° C., and 190° C. according to the least-squares method, a value of 0.99 or more is usually employed as a correlation coefficient.

The melt complex viscosity-angular frequency curve is measured with a viscoelasticity meter (for example, Rheometrics Mechanical Spectrometer RMS-800, manufactured by Rheometrics, and the like) usually under the conditions of a geometry with parallel plate, a plate diameter with 25 mm, a plate clearance with 1.5 to 2 mm, a strain with 5%, and an angular frequency with 0.1 to 100 rad/sec. The measurement is carried out under a nitrogen atmosphere, and a sample for measurement may be blended in advance with an appropriate amount of antioxidant (for example, 1000 ppm).

The molecular weight distribution (Mw/Mn) of the ethylene-α-olefin copolymer, in view of enhancing moldability, especially in view of lowering extrusion load, is preferably 3 or more, more preferably 5 or more, and even more preferably 6 or more; and in view of enhancing mechanical strength of moldings, being preferably 25 or less, more preferably 20 or less, and even more preferably 15 or less. The molecular weight distribution (Mw/Mn) is a value of Mw divided by Mn, wherein the weight average molecular weight (Mw) and the number average molecular weight (Mn) are measured by a gel permeation chromatography (GPC). Conditions for GPC measurement are exemplified as follows:

(1) Apparatus: Waters 150C manufactured by Water, Inc.
(2) Separation column: TOSOH TSKgelGMH6-HT
(3) Measurement temperature: 140° C.
(4) Carrier: ortho-dichlorobenzene
(5) Flow rate: 1.0 mL/minute
(6) Injected volume: 500 μL
(7) Detector: Differential refractometer
(8) Standard substance for molecular weight: Standard polystyrene A melt flow rate ratio (MFRR) of the ethylene-α-olefin copolymer, in view of enhancing moldability, especially reducing extrusion load, is preferably 60 or more, more preferably 70 or more, and even more preferably 80 or more; and the MFRR is usually 210 or less, in view of enhancing mechanical strength, preferably 190 or less, and more preferably 170 or less. The MFRR is a value that a melt flow rate (MFR-H, expressed in g/10 minutes) measured according to a method coded in JIS K7210-1995 under conditions of a test load of 211.82 N and a measurement temperature of 190° C. is divided by a melt flow rate (MFR) measured according to a method coded in JIS K7210-1995 under conditions of a load of 21.18 N and a temperature of 190° C. In the melt flow rate measurement mentioned above, usually used is a polymer blended in advance with about 1000 ppm of an antioxidant.

The first ethylene-α-olefin copolymer of the invention is a polymer having the number of inflection points of 3 or less on a melting curve obtained by a differential scanning calorimetry within a temperature range from 25° C. to an end point of melting. If the number of inflection points is large, this means that there exist a number of other melting peaks or shoulder peaks other than the maximum melting peak (a melting peak having the highest peak height) on the melting curve of the ethylene-α-olefin copolymer, thus means that there exist a number of polymer components having a different content of the monomer unit in the ethylene-α-olefin copolymer and the composition distribution of the ethylene-α-olefin copolymer (i.e. distribution of monomer unit contents in polymer components contained in the ethylene-α-olefin copolymer) is broad. On the other hand, if the number of inflection points is small, this means the composition distribution) of the ethylene-α-olefin copolymer is narrow. When the number of inflection points is too large, this may cause a reduction of heat shrinkability. The inflection point mentioned in this specification refers to a transition point of the melting curve changing from being concaved to convexed or from being convexed to concaved.

The first ethylene-α-olefin copolymer of the present invention, in view of enhancing heat shrinkability and heat resistance, preferably satisfies the formula (1) mentioned hereinafter wherein a density of the ethylene-α-olefin copolymer is d (kg/m$^3$) and a maximum melting point (a temperature at a peak of endothermic heat flow profile having the highest peak height (maximum melting peak) in the melting curve) is Tm (°C), more preferably satisfying the formula (1'), even more preferably satisfying the formula (1"), and still even more preferably satisfying the formula (1''').

The second ethylene-α-olefin copolymer of the present invention is a copolymer satisfying the following formula (1) wherein a density of the ethylene-α-olefin copolymer is d (kg/m$^3$) and a maximum melting point (a temperature at a peak of endothermic heat flow profile having the highest peak height (maximum melting peak) in the melting curve) is Tm (° C.):

$$0.675 \times d - 515.5 \leq Tm \leq 0.775 \times d - 601 \qquad (1).$$

In an ethylene-α-olefin copolymer having a narrow composition distribution, properties of a major polymer component of the copolymer are dominant in that of the copolymer. Therefore, a melting point of the major polymer component of the copolymer becomes near to that of a ethylene-α-olefin copolymer consisted of a single component (consisted only of a polymer component of which monomer unit content is same as the monomer unit content of the whole copolymer (average monomer unit content)). It is known that an average monomer unit content of the ethylene-α-olefin copolymer correlates with a density. To say other words, the formula (1) mentioned above is an index to represent a narrowness of the composition distribution.

The second ethylene-α-olefin copolymer of the invention, in view of enhancing heat shrinkability and heat resistance, preferably has narrow composition distribution; that is, a maximum melting point (Tm) of the ethylene-α-olefin copolymer preferably satisfies the formula (1'), more preferably satisfying the formula (1"), and even more preferably satisfying the formula (1'''):

$$0.675 \times d - 515.5 \leq Tm \leq 0.775 \times d - 602.5 \qquad (1')$$

$$0.675 \times d - 515 \leq Tm \leq 0.775 \times d - 602.5 \qquad (1'')$$

$$0.675 \times d - 514.5 \leq Tm \leq 0.775 \times d - 603 \qquad (1''').$$

The second ethylene-α-olefin copolymer of the invention, in view of enhancing heat shrinkability and heat resistance, preferably also has the number of the above-mentioned inflection points of 3 or less, which is the number of inflection points existing on a melting curve obtained by a differential scanning calorimetry within a temperature range from 25° C. to an end point of melting.

A melting curve of the ethylene-α-olefin copolymer can be derived from a differential scanning calorimetry curve measured with a differential scanning calorimeter (for example, the differential scanning calorimeter DSC-7 type manufactured by Perkin Elmer Co., Ltd.) according to a procedure such that about 10 mg of sample enclosed in a pan made of aluminum is (1) preserved at 150° C. for 5 minutes, (2) cooled down from 150° C. to 20° C. at a rate of 5° C./minute, (3) again preserved at 20° C. for 2 minutes, (4) further heated up from 20° C. to a temperature of an end point of melting plus about 20° C. (usually about 150° C.) to obtain the curve from the step (4).

A method for producing the ethylene-α-olefin copolymer of the invention includes copolymerizing ethylene and α-olefin in the presence of a catalyst which is formed by contacting metallocene-based complex (a transitional metal complex having a cyclopentadienyl-type anion skeleton), a fine particle-like support, and a compound forming an ionic complex by ionizing the metallocene complex. In the production method, preferable is a method of copolymerizing ethylene and α-olefin with using a solid catalyst component carrying a catalyst component on a fine particle-like support, and the solid catalyst component, for example, may use a co-catalyst support which carries a compound forming an ionic complex by ionizing the metallocene complex (for example, organic aluminum oxy compounds, boron compounds, and organic zinc compounds) on a fine particle-like support.

The fine particle-like support is preferably a porous material, and may use inorganic oxides such as $SiO_2$, $Al_2O_3$, MgO, $ZrO_2$, $TiO_2$, $B_2O_3$, CaO, ZnO, BaO, and $ThO_2$; clays and clay minerals such as smectite, montmorillonite, hectolite, laponite, and saponite; and organic polymers such as polyethylene, polypropylene, and styrene-divynilbenzene copoymer. A 50% volume average particle diameter of the fine particle-like support is usually 10 to 500 μm, and the 50% volume average particle diameter is determined with a laser diffracted light scattering system and the like. Pore volumes of the fine particle-like support are usually 0.3 to 10 ml/g, and the pore volumes are usually measured with a gas adsorption method (BJH method). A specific surface area of the fine particle-like support is usually 10 to 1000 m$^2$/g, the specific surface area is usually measured with a gas adsorption method (BET method).

As a method for producing the ethylene-α-olefin copolymer of the invention, particularly suitably included is copolymerizing ethylene and α-olefin in the presence of a catalyst which is formed by contacting the co-catalyst support (A) mentioned below, metallocene-based complex (B) with a structure in which two cyclopentadienyl anion skeletons is connected through a bridging group such as alkylene group or silylene group, and an organoaluminum compound (C).

The co-catalyst support (A) mentioned above is a support obtained by contacting a component (a); diethyl zinc, a component (b); two kinds of fluorized phenoles, a component (c) water, a component (d); inorganic fine particle-like support, and a component (e); trimethyldisilazane ($((CH_3)_3Si)_2NH$).

The fluorinated phenole of the component (b) includes pentafluorophenol, 3,5-difluorophenol, 3,4,5-trifluorophenol, 2,4,6-trifluorophenol, and the like. From the viewpoint of enhancing the activation energy of flow (Ea) of the ethylene-α-olefin copolymer, it is preferable to use two kinds of fluorinated phenoles respectively having the different number of fluorine atoms; for example, included are combinations of pentafluorophenol/3,4,5-trifluorophenol, pentafluorophenol/2,4,6-trifluorophenol, and pentafluorophenol/3,5-difluorophenol, preferably a combination of pentafluorophenol/3,4,5-trifluorophenol. A molar ratio between a fluorinated phenole with the larger number of fluorine atoms and that with the smaller number of fluorine atoms is usually 20/80 to 80/20. From the viewpoint of enhancing heat shrinkability, preferable is a smaller molar ratio such as 50/50 or less, and more preferably 40/60 or less.

The inorganic fine particle-like support of the component (d) is preferably a silica gel.

There is no particular limitation regarding to amounts using the component (a), the component (b) and the component (c), and they are preferably used in a manner that, if a molar ratio between them is defined as the component (a): the component (b): the component (c)=1:x:y, the x and y satisfy the following equation:

$|2-x-2y| \leq 1$.

A value of x in the above equation is preferably 0.01 to 1.99, more preferably 0.10 to 1.80, even more preferably 0.20 to 1.50, and most preferably 0.30 to 1.00.

The component (d) is used to the component (a) in an amount such that, when a particle is formed by contacting the component (a) with the component (d), the mole number of zinc atoms derived from the component (a) contained in 1 g of the particle is preferably 0.1 mmol or more, and more preferably 0.5 to 20 mmol. The component (e) is generally used in an amount of 0.1 mmol or more per 1 g of the component (d), and more preferably 0.5 to 20 mmol.

A metal atom of the metallocene complex (B) which has a ligand having a structure in which two cyclopentadienyl type anion skeletons are connected through a bridging group such as an alkylene group or silylene group, includes preferably atoms belonging to the group 4 of the Periodic Table of the Elements, and more preferably zirconium and hafnium. The ligand includes preferably indenyl group, methylindenyl group, methylcyclopentadienyl group, and dimethylcyclopentadienyl group; and the bridging group includes preferably ethylene group, dimethylmethylene group, and dimethylsilylene group. The rest of substituents owned by the metal atom includes preferably diphenoxy group and dialkoxy group. The metallocene-based complex (B) includes preferably ethylenebis(1-indenyl)zirconium diphenoxide.

The organoaluminum compound (C) includes preferably triisobutylaluminum and tri-n-octylaluminum.

The metallocene complex (B) is preferably used in an amount of $5 \times 10^{-6}$ to $5 \times 10^{-4}$ mol per 1 g of the co-catalyst support (A). The organoaluminum compound (C) is preferably used in an amount of 1 to 2000 in terms of a molar ratio (Al/M) of the aluminum atom of the organoaluminum compound (C) to the metal atom of the metallocene-based complex (B).

In the catalyst for polymerization which is prepared by contacting the above mentioned co-catalyst support (A), metallocene complex (B), and an organoaluminum compound (C), the catalyst may be prepared, depending on requirements, by contacting an electron donating compound (D) to the co-catalyst support (A), metallocene-based complex (B), and an organic aluminum compound (C). The electron donating compound includes preferably triethylamine and tri-n-octylamine.

In view of enlarging a molecular weight distribution of the ethylene-α-olefin copolymer to be obtained, the electron donating compound (D) is preferably used, which is used preferably 0.1% by mole or more to the mole number of aluminum atoms of the organic aluminum compound (C), and more preferably 1% by mole or more; and in view of enhancing catalyst activity, being preferably 10% by mole or less, and more preferably 5% by mole or less.

As a method for producing the ethylene-α-olefin copolymer of the invention, ethylene and α-olefin is preferably copolymerized with a pre-polymerization solid component as a catalyst component or catalyst, the pre-polymerization solid component being prepared by polymerizing a small amount of olefin with using a solid catalyst component carrying a catalyst component on a fine particle-like support (hereinafter, referred to as pre-polymerization), for example, a pre-polymerization solid component prepared by polymerizing a small amount of olefin with using a co-catalyst support, metallocene-based complex, and other co-catalyst component (e.g. alkylating agents including organoaluminum compounds).

The olefin used in the pre-polymerization includes ethylene, propylene, 1-butene, 1-pentene, 1-hexene, 1-octene, 4-methyl-1-pentene, cyclopentene, and cyclohexene. They may be used independently or as a combination of two or more kinds thereof. An amount of the polymer contained in the pre-polymerization solid component is usually 0.1 to 500 g per 1 g of solid catalyst component, preferably 1 to 200 g.

A method for pre-polymerization may be continuous- or batch-polymerizations, for example, including batch-system slurry polymerizations, continuous-system slurry polymerizations, and continuous-system gas phase polymerizations. Catalyst components such as a co-catalyst support, metallocene complex, and other co-catalyst component (e.g. alkylating agents such as organoaluminum compounds) are usually charged into a polymerization reactor with a way of putting them with using an inert gas such as nitrogen or argon, hydrogen, ethylene and the like under a water free condition, or a way of putting a solution or slurry which dissolves or dilutes them with a solvent.

In the pre-polymerization, from the viewpoint of enhancing heat shrinkability of a ethylene-α-olefin copolymer to be obtained, the catalyst components are preferably input into a polymerization reactor in a manner such that a co-catalyst support and a metallocene-based complex are contacted to form a pre-contacted substance, and then the pre-contacted substance obtained is further contacted with the other co-catalyst component to form a contacted substance which will be a pre-polymerization catalyst, this manner is exemplified as follows: (1) a method of putting the co-catalyst support and metallocene-based complex into a polymerization reactor, followed by putting the other co-catalyst component therein; (2) a method of contacting in advance the co-catalyst support and metallocene-based complex to obtain a pre-contacted substance, putting the pre-contacted substance obtained into a polymerization reactor, and then putting the other co-catalyst component therein; (3) a method of contacting in advance the co-catalyst support and metallocene-based complex to obtain a pre-contacted substance, putting the pre-contacted substance obtained into a polymerization reactor in which the other co-catalyst component has been already input; and (4) a method of preparing in advance a contacted substance consisting of the co-catalyst support, metallocene-based complex, and the other co-catalyst component by contacting the co-catalyst support and metallocene-based complex to obtain a pre-contacted substance, followed by contacting the pre-contacted substance obtained with the other co-catalyst component, and then putting the contacted substance obtained into a polymerization reactor. The co-catalyst support and the metallocene-based complex is preferably contacted in an inert solvent such as aliphatic hydrocarbons including butane, pentane, hexane, heptane, and octane; and aromatic hydrocarbons including benzene and toluene; and a temperature for contacting treatment, from viewpoint of enhancing heat shrinkability, is preferably 50 to 100° C.

A pre-polymerization temperature is usually lower than the melting point of the polymer pre-polymerized, preferably 0 to 100° C., more preferably 10 to 70° C.

When the pre-polymerization is conducted by a slurry polymerization, a solvent used includes hydrocarbons having carbon numbers of 20 or less; for example, including saturated aliphatic hydrocarbon such as propane, n-butane, isobutane, n-pentane, isopentane, n-hexane, cyclohexane, heptane, octane, and decane; and aromatic hydrocarbons such as benzene, toluene, and xylene. They may be used alone or in a combination of two or more kinds thereof.

The ethylene-α-olefin copolymer is preferably produced with a continuous polymerization method which accompanies formation of particles of ethylene-α-olefin copolymer; for example including continuous gas-phase polymerization methods, continuous slurry polymerization methods, and continuous bulk polymerization methods, preferably the continuous gas-phase polymerization methods. The continuous gas-phase polymerization apparatus used for the methods is usually an apparatus with a fluidized bed reactor, and preferably an apparatus with a fluidized bed reactor having an enlarged member. An agitation blade paddle may be mounted in the reactor vessel.

A method for supplying the pre-polymerization solid component pre-polymerized into a continuous polymerization reactor which accompanies formation of particles of ethylene-α-olefin copolymer usually includes away of supplying it with using an inert gas such as nitrogen or argon, hydrogen, ethylene and the like under a water free condition, or a way of supplying a solution or slurry which dissolves or dilutes it with a solvent.

A temperature for polymerization accompanying formation of ethylene-α-olefin copolymer particles is usually less than a melting point of the ethylene-α-olefin copolymer, preferably 0 to 150° C., and more preferably 30 to 100° C.; in view of enhancing gloss of moldings, preferably less than 90° C., and specifically 70 to 87° C. Hydrogen may be added as a molecular weight modifier to control a melt flow of the ethylene-α-olefin copolymer. And, an inert gas may be coexisted in the mixed gas. When the pre-polymerization solid component is used, a co-catalyst component such as an organoaluminum compound may be appropriately used.

Furthermore, in the production of the ethylene-α-olefin copolymer of the present invention, it is preferable that the process contains a step of kneading (1) an ethylene-α-olefin copolymer obtained by polymerization with an extruder having an extended flow kneading die, for example, a die developed by Utracki et al and disclosed in U.S. Pat. No. 5,451,106, or (2) an extruder equipped with counter-rotating twin screws having a gear pump, and preferably with a retention part between the screw and die, or the like.

The ethylene-α-olefin copolymer of the invention may contain known additives depending on requirements. The additives include, for example, antioxidants, weather resistant agents, lubricants, antiblocking agents, antistatic agents, antifogging agents, non-dripping agents, pigments, and fillers.

The ethylene-α-olefin copolymer of the invention may be molded to various moldings (e.g. films, sheets, bottles, trays) with a known molding method such as extrusion molding methods including inflation film molding processing methods and T-die film molding processing methods, injection molding methods, and compression molding methods. The extrusion molding methods are suitably used.

The ethylene-α-olefin copolymer of the invention, due to its excellent heat shrinkability, is suitably used to packagings which wrap foods or non-food materials and then are shrunk with heat to tightly wrapping them, which are exemplified by heat shrinkable wrapping films such as shrink wrapping films, shrink films, and shrink labels; and heat shrinkable tube.

EXAMPLES

The invention will be explained by referring to Examples and Comparative Examples.

Physical properties in Examples and Comparative Examples were determined by the following methods:

[Physical Properties of Polymer]

(1) Melt Flow Rate (MFR, unit: g/10 minutes)

Determined with the A method coded in JIS K7210-1995 under conditions of a temperature of 190° C. and a load of 21.18 N.

(2) Melt Flow Rate Ratio (MFRR)

MFRR was defined with a value that a melt flow rate (MFR-H, unit: g/10 minutes) measured according to JIS K7210-1995 under conditions of a test load of 211.82 N and a measurement temperature of 190° C. is divided by a melt flow rate (MFR) measured according to JIS K7210-1995 under conditions of a load of 21.18 N and a temperature of 190° C.

(3) Density (unit: $kg/m^3$)

It was measured according to A method of JIS K7112-1980. A sample had been annealed according to JIS K6760-1995 prior to the measurement.

(4) Activation Energy of Flow (Ea, unit: kJ/mol)

It was determined as follows: measuring a melting complex viscosity-angular frequency curve with a viscoelasticity meter (Rheometrics Mechanical Spectrometer RMS-800, manufactured by Rheometrics) at 130° C., 150° C., 170° C., and 190° C., respectively with the conditions described below, and forming a master curve of melting complex viscosity-angular frequency at 190° C. from the obtained melting complex viscosity-angular frequency curves with using a calculation software which is Rhios V.4.4.4 manufactured by Rheometrics:

<Measurement Conditions>
Geometry: Parallel plate
Plate diameter: 25 mm
Plate clearance: 1.5 to 2 mm
Strain: 5%
Angular frequency: 0.1 to 100 rad/sec
Measurement atmosphere: Nitrogen (5) Molecular Weight Distribution (Mw/Mn)

A molecular weight distribution (Mw/Mn) was determined by measuring a weight average molecular weight (Mw) and a number average molecular weight (Mn) by a gel permeation chromatography (GPC) under the conditions of (1) to (8) described below.

A baseline on a chromatogram was defined with a line connecting points belonged in two stably horizontal regions, one of which regions had a retention time sufficiently shorter before an elution peak of a sample emerging, and other of which regions had a retention time sufficiently longer after an elution peak of a solvent being observed:

(i) Apparatus: Waters 150C manufactured by Water Associates, Inc.
(ii) Separation column: TOSOH TSKgelGMH6-HT
(iii) Measurement temperature: 140° C.
(iv) Carrier: Orthodichlorobenzene
(v) Flow rate: 1.0 mL/minute
(vi) Injected volume: 500 μL (vii) Detector: Differential refractometer (viii) Standard substance for molecular weight: Standard polystyrene.

(6) The Number of Inflection Points of Melting Curve, Maximum Melting Point (Tm)

A test piece was prepared by pressing an ethylene-α-olefin copolymer with a hot pressing device at 150° C. under a pressure of 10 MPa for 5 minutes, cooling down with a cool pressing device at 30° C. for 5 minutes to mold a sheet with about 100 μ-thick, and then cutting about 10 mg of a sample out from the sheet to be enclosed in a pan made of aluminum. The sample enclosed in the aluminum pan was subjected to measurement of a melting curve with a differential scanning calorimeter (the differential scanning calorimeter DSC-7 type manufactured by Perkin Elmer Co., Ltd.) according to a procedure of (1) preserving at 150° C. for 5 minutes, (2) cooling down from 150° C. to 20° C. at a rate of 5° C./minute, (3) again preserving at 20° C. for 2 minutes, (4) further heating up from 20° C. to 150° C. to obtain the curve from the step (4). According to the melting curve obtained, determined were a temperature at a melting peak having the highest peak height among the melting peaks observed in the range of from 25° C. to an end point of melting (the temperature at which the melting curve returned to a base line in the high temperature side) and the number of inflection points present in the range of from 25° C. to the end point of melting.

[Moldability]

(7) Resin Pressure (Expressed in MPa)

A resin pressure of an extruder was measured while molding an inflation film with 50 μm-thick with a blown film molding device manufactured by Placo Co., Ltd. (a monoaxial extruder with a full flight type screw (diameter of 30 mmφ, L/D=28), dies (die diameter of 50 mmφ, lip gap of 0.8 mm), double slits airing) under conditions of a processing temperature of 170° C., an extrusion volume of 5.5 kg/hr, a frost line distance (FLD) of 200 mm, and a blow up ratio of 1.8. The lower the resin pressure is, the more excellent the moldability is.

[Properties of Film]

(8) Heat Shrinkability

A test piece with 9 cm long in the direction of mold flowing and 9 cm wide in the horizontal direction was sampled from a film. The test piece was loosely fastened with two wire meshes and then immersed (1) in an oil bath at 115° C. for 5 seconds, (2) in an oil bath at 118° C. for 5 seconds, or (3) in an oil bath at 120° C. for 10 seconds. After the immersion, taking out the test piece to an atmosphere at a room temperature for cooling down, and then wiping out oils adhered thereon, a length L (expressed in cm) of the test piece in the direction of mold flowing was measured to calculate a heat shrinking ratio (expressed in %) at 115° C., 118° C., or 120° C. respectively according to the following formula:

Heat shrinking ratio=100×(9−L)/9.

Example 1

(1) Preparation of Co-Catalyst Support

Into a reactor equipped with a stirrer, purged with nitrogen were charged 0.36 kg of silica (Sylopol 948 manufactured by Devison, Ltd; average particle size=59 μm; pore volume=1.68 ml/g; specific surface area=313 m²/g) heat-treated at 300° C. under a nitrogen flow and 3.5 L of toluene, then the resulting mixture was stirred. The mixture was cooled to 5° C., then, a mixed solution of 0.15 L of 1,1,1,3,3,3-hexamethyldisilazane and 0.2 L of toluene was added thereto dropwise over 30 minutes while keeping 5° C. After completion of the dropping, the mixture was stirred at 5° C. for 1 hour, then at 95° C. for 3 hours after heated to 95° C. and filtrated. Thus obtained solid was washed six times with each toluene of 2 L. Thereafter, 2 L of toluene was added to obtain a slurry, then, the mixture was allowed to stand still overnight.

Putting 0.27 liters of a hexane solution of diethyl zinc (diethyl zinc concentration: 2 mol/L) into the slurry obtained above to obtain a mixture in the reactor, thereafter stirring the mixture obtained; and then cooling down to 5° C. Dropping a mixture of 0.05 kg of pentafluorophenol and 0.09 L of toluene in the reactor for 60 minutes with maintaining the temperature of the reactor at 5° C. After completion of the dropping, stirring the resultant mixture at 5° C. for 1 hour, heating up to 40° C., stirring at 40° C. for 1 hour; and then again cooling down to 5° C., thereafter dropping 7 g of H₂O in the reactor for 1.5 hours with maintaining the temperature of the reactor at 5° C. After completion of the dropping, stirring the resultant mixture at 5° C. for 1.5 hours, heating up to 55° C., stirring at 55° C. for 2 hours; and then cooling down to a room temperature. Thereafter putting 0.63 liters of a hexane solution of diethyl zinc (diethyl zinc concentration: 2 moles/liter) in the reactor; and then cooling the resultant mixture down to 5° C. Dropping a mixture of 94 g of 3,4,5-trifluorophenol and 0.2 liters of toluene in the reactor for 60 minutes with maintaining the temperature of the reactor at 5° C. After completion of the dropping, stirring the resultant mixture at 5° C. for 1 hour, heating up to 40° C., stirring at 40° C. for 1 hour; and then again cooling down to 5° C. Thereafter dropping 17 g of H₂O in the reactor for 1.5 hours with maintaining the temperature of the reactor at 5° C. After completion of the dropping, stirring the resultant mixture at 5° C. for 1.5 hour, heating up to 40° C., stirring at 40° C. for 2 hours; and then further heating up to 80° C., and stirring at 80° C. for 2 hours. Thereafter, leaving the mixture in the reactor at rest to precipitate a solid component until an interface between a lower layer of solid component precipitated and an upper layer of slurry appearing, removing the upper slurry layer, and then removing a liquid component contained in the lower layer by filtration to collect a solid component, and then adding 3 liters of toluene to the solid component collected to obtain a slurry, and then stirring the slurry obtained at 95° C. for 2 hours. Thereafter, leaving the slurry described just above at rest to precipitate a solid component until an interface between a lower layer of solid component precipitated and an upper layer of slurry appearing, and then removing the upper slurry layer. Thereafter, providing the following procedure to the lower layer of solid component four cycles at 95° C. with 3 liters of toluene respectively and two cycles at a room temperature with 3 liters of hexane respectively; the procedure being adding the solvent, stirring, leaving at rest to precipitate a solid component until an interface between a lower layer of solid component precipitated and an upper layer of slurry appearing, and then removing the upper slurry layer. Thereafter, removing a liquid component contained in the lower layer by filtration; and then drying under a reduced pressure at a room temperature for 1 hour to obtain a solid component (hereinafter, referred to as a co-catalyst support (a)).

(2) Preparation of Pre-Polymerization Catalyst Component

After charging 80 liters of butane into an autoclave having an interior volume of 210 liters equipped with an agitator under a nitrogen substitution atmosphere, putting 92 mmol of racemi-ethylenebis(1-indenyl)zirconium diphenoxide, and then heating the autoclave up to 50° C. to agitate for 2 hours.

After decreasing the temperature of the autoclave down to 30° C. to stabilize its system, charging ethylene in an amount corresponding to a 0.03 MPa of the gas phase pressure in the autoclave, putting 0.6 kg of the co-catalyst support (a) mentioned above, and then putting 135 mmol of triisobutylaluminum to start polymerization. The pre-polymerization was carried out for totally 4 hours while continuously charging ethylene at a rate of 0.7 kg/hour for 30 minutes, and then raising the polymerization temperature up to 50° C. as well as continuously charging ethylene at a rate of 3.5 kg/hour and hydrogen at a rate of 7 liters (a volume in terms of an ambient temperature and pressure)/hour. After completion of the polymerization, purging the residual ethylene, butane, and hydrogen gases and then a solid left was dried under vacuum to obtain a pre-polymerization catalyst component in which 13 g of ethylene was pre-polymerized per 1 g of the co-catalyst support (a) mentioned above.

(3) Production of Ethylene-α-Olefin Copolymer

With using the pre-polymerization catalyst component obtained above, ethylene and 1-hexene were copolymerized with a continuous fluidized bed gas-phase polymerization apparatus to obtain a polymer powder. The polymerization was conducted under conditions of a polymerization temperature of 87° C., a polymerization pressure of 2 MPa, a molar ratio of hydrogen to ethylene of 0.8%, a molar ratio of 1-hexene to the sum of ethylene and 1-hexene of 0.9% with continuously charging ethylene, 1-hexene, and hydrogen gases to keep the above gas molar ratios during the polymerization. The pre-polymerization catalyst component mentioned above and triisobutylaluminum were also continuously supplied to maintain a total amount of powder in the fluidized bed to be 80 kg; and the average polymerization time was 4 hours. The polymer powder obtained was blended with 750 ppm of antioxidant (Sumilizer GP manufactured by SUMITOMO CHEMICAL) and pelletized with an extruder (LCM50 manufactured by KOBE STEEL, LTD.) under conditions of a feed rate of 50 kg/hr, a screw rotating speed of 450 rpm, a gate opening of 50%, a suction pressure of 0.1 MPa, and a resin temperature of 200 to 230° C., to obtain an ethylene-1-hexene copolymer. The results of evaluating physical properties of the ethylene-1-hexene copolymer obtained are shown in Table 1.

(4) Film Molding

The ethylene-1-hexene copolymer obtained was molded to an inflation film with 50 μm-thick with a blown film molding device manufactured by Placo Co., Ltd. (a single screw extruder with a full flight type screw (diameter of 30 mmφ, L/D=28), dies (die diameter of 50 mmφ, lip gap of 0.8 mm), double slits airing) under conditions of a processing temperature of 170° C., an extrusion volume of 5.5 kg/hr, a frost line distance (FLD) of 200 mm, and a blow up ratio of 1.8. The results of evaluating physical properties of the film obtained are shown in Table 1.

Example 2

(1) Production of Ethylene-α-Olefin Copolymer

With using the pre-polymerization catalyst component obtained in the step of Preparation of pre-polymerization catalyst component in Example 1 (2), ethylene and 1-hexene were copolymerized with a continuous fluidized bed gas-phase polymerization apparatus in the same manner as in Example 1 except for changing a molar ratio of hydrogen to ethylene to 0.9% and a molar ratio of 1-hexene to the sum of ethylene and 1-hexene to 1.0%; and then pelletized to obtain an ethylene-1-hexene copolymer in the same manner as in Example 1. The results of evaluating physical properties of the ethylene-1-hexene copolymer obtained are shown in Table 1.

(2) Film Molding

The ethylene-1-hexene copolymer obtained was molded to an inflation film with 50μ thick in the same molding conditions as in Example 1(4). The results of evaluating physical properties of the film obtained are shown in Table 1.

Example 3

(1) Preparation of Co-Catalyst Support

Subjecting a silica (Sylopol948 manufactured by Devison Co., Ltd.; 50% volume average particle diameter=55 μm: pore volume=1.67 ml/g; specific surface area=325 m$^2$/g) to a heat treatment at 300° C. under nitrogen circulation, putting 2.8 kg of the silica treated above and 24 kg of toluene into a reactor equipped with an agitator under a nitrogen substitution atmosphere to obtain a mixture, stirring the mixture obtained and then cooling down to 5° C.; dropping a mixture of 0.91 kg of 1,1,1,3,3,3-hexamethyldisilazane and 1.43 kg of toluene in the rector for 33 minutes with maintaining the temperature of the reactor at 5° C. After completion of the dropping, stirring the resultant mixture at 5° C. for 1 hour, heating up to 95° C., stirring at 95° C. for 3 hours, and then filtrating to collect a solid component. Washing the solid component collected six times with 21 kg of toluene respectively; and then adding 6.9 kg of toluene to obtain a slurry, and then leaving the slurry obtained at rest for overnight.

Putting 2.05 kg of a hexane solution of diethyl zinc (diethyl zinc concentration: 50% by weight) and 1.3 kg of hexane into the slurry obtained above to obtain a mixture, thereafter stirring the mixture; and then cooling down to 5° C. Dropping a mixture of 0.77 kg of pentafluorophenol and 1.17 kg of toluene in the reactor for 61 minutes with maintaining the temperature of the reactor at 5° C. After completion of the dropping, stirring the resultant mixture at 5° C. for 1 hour, heating up to 40° C., stirring at 40° C. for 1 hour; and then again cooling down to 5° C. Thereafter, dropping 0.11 kg of H$_2$O in the reactor for 1.5 hours with maintaining the temperature of the reactor at 5° C. After completion of the dropping, stirring the resultant mixture at 5° C. for 1.5 hours, heating up to 55° C., stirring at 55° C. for 2 hours. Thereafter, putting 1.4 kg of a hexane solution of diethyl zinc (diethyl zinc concentration 50% by weight) and 0.8 kg of hexane in the reactor at a room temperature; and then cooling the resultant mixture down to 5° C. Thereafter, dropping a mixture of 0.42 kg of 3,4,5-trifluorophenol and 0.77 g of toluene in the reactor for 60 minutes with maintaining the temperature of the reactor at 5° C. After completion of the dropping, stirring the resultant mixture at 5° C. for 1 hour, heating up to 40° C., stirring at 40° C. for 1 hour; and then again cooling down to 5° C., thereafter dropping 0.077 kg of H$_2$O in the reactor for 1.5 hours with maintaining the temperature of the reactor at 5° C. After completion of the dropping, stirring the resultant mixture at 5° C. for 1.5 hours, heating up to 40° C., stirring at 40° C. for 2 hours; and then further heating up to 80° C., and stirring at 80° C. for 2 hours. After the agitation, drawing a supernatant fluid out from the mixture to leave 16 liters of a residual solution, and then putting 11.6 kg of toluene in the residual solution, thereafter heating the resultant solution up to 95° C. and stirring for 4 hours. After the agitation, drawing a supernatant fluid out from the solution to obtain a solid component. Thereafter, washing the solid component obtained four times with 20.8 kg of toluene respectively and three times with 24 liters of hexane respectively, and then drying to obtain a solid component (hereinafter, referred to as a co-catalyst support (b)).

(2) Preparation of Pre-Polymerization Catalyst Component

After charging 80 liters of butane under an ambient temperature into a reactor having an interior volume of 210 liters equipped with an agitator under a nitrogen substitution atmosphere, putting 73 mmol of racemi-ethylenebis(1-indenyl) zirconium diphenoxide, and then raising an interior temperature of the reactor up to 50° C. to agitate for 2 hours. After decreasing the interior temperature of the reactor down to 30° C., charging 0.1 kg of ethylene. Thereafter, putting 661 g of the cocatalyst support (b), and then the charging hydrogen gas of 0.1 liter in terms of an ambient temperature and pressure. After stabilizing the system in the reactor, putting 105 mmol of triisobutylaluminum to start polymerization. After commencement of polymerization, the pre-polymerization was carried out at temperatures inside the reactor as being 30° C. for the duration of initial 0.5 hours, being raised up to 50° C. for 30 minutes, and then being 50° C. This pre-polymerization was conducted for totally 4 hours while, during the duration of initial 0.5 hours, charging ethylene at a rate of 0.7 kg/hour and hydrogen gas at a rate of 1.1 liter/hour in terms of an ambient temperature and pressure; and after the 0.5 hours having passed, charging ethylene at a rate of 3.5 kg/hour and hydrogen gas at a rate of 10.2 liter/hour in terms of an ambient temperature and pressure. After completion of the polymerization, reducing the interior pressure of the reactor to 0.5 MPaG, transferring a pre-polymerization catalyst component in a slurry state to a dryer, followed by subjecting to drying under nitrogen circulation to obtain a pre-polymerization catalyst component.

An amount of pre-polymerized ethylene contained in the pre-polymerization catalyst component was 18.2 g per 1 g of the co-catalyst support.

(3) Production of Ethylene-α-Olefin Copolymer

With using a continuous fluidized bed gas-phase polymerization apparatus, polymerization was conducted under conditions of a polymerization temperature of 85° C., a pressure of 2.0 MPaG, a molar ratio of hydrogen to ethylene of 2.5%, a molar ratio of 1-butene to the sum of ethylene, 1-butene, and 1-hexene of 2.1% and a molar ratio of 1-hexene to this sum of 0.6% with continuously charging ethylene, 1-butene, 1-hexene, and hydrogen gases to keep the above gas molar ratios during the polymerization. The pre-polymerization catalyst component mentioned above, triisobutylaluminum, and triethylamine (of which molar ratio to triisobutylaluminum was 3%) were also continuously supplied to maintain an total amount of powder in the fluidized bed to be 80 kg; and the average polymerization time was 4 hours. The powder of ethylene-1-butene-1-hexene copolymer obtained was pelletized with an extruder (LCM50 manufactured by KOBE STEEL, LTD.) under conditions of a feed rate of 50 kg/hr, a screw rotating speed of 450 rpm, a gate opening of 50%, a suction pressure of 0.1 MPa, and a resin temperature of 200 to 230° C., thereby an ethylene-1-butene-1-hexene copolymer was obtained. The results of evaluating physical properties of the ethylene-1-butene-1-hexene copolymer obtained are depicted in Table 1.

(4) Film Molding

The ethylene-1-hexene copolymer obtained was molded to a blown film with 50µ thick under the same processing conditions as in Example 1(4). The results of evaluating physical properties of the film obtained are shown in Table 1.

Example 4

(1) Preparation of Pre-Polymerization Catalyst Component

After charging 80 liters of butane under an ambient temperature into a reactor having an interior volume of 210 liters equipped with an agitator under a nitrogen substitution atmosphere, putting 73 mmol of racemi-ethylenebis(1-indenyl) zirconium diphenoxide, and then raising an interior temperature of the reactor up to 50° C. to agitate for 2 hours. After decreasing the interior temperature of the reactor down to 30° C., charging 0.1 kg of ethylene. Thereafter, putting 700 g of the co-catalyst support prepared with the same manner as in Example 3(1). After stabilizing the system in the reactor, putting 210 mmol of triisobutylaluminum to start polymerization. After commencement of polymerization, the pre-polymerization was carried out at temperatures inside the reactor as being 30° C. for the duration of initial 0.5 hours, being raised up to 50° C. for 30 minutes, and then being 50° C. This pre-polymerization was conducted for totally 4 hours while, during the duration of initial 0.5 hours, charging ethylene at a rate of 0.7 kg/hour; and after the 0.5 hours having passed, charging ethylene at a rate of 3.5 kg/hour and hydrogen gas at a rate of 7.0 liter/hour in terms of an ambient temperature and pressure. After completion of the polymerization, reducing the interior pressure of the reactor to 0.5 MPaG, transferring a pre-polymerization catalyst component in a slurry state to a dryer, followed by subjecting to drying under nitrogen circulation to obtain a pre-polymerization catalyst component. An amount of pre-polymerized ethylene contained in the pre-polymerization catalyst component was 14.0 g per 1 g of the co-catalyst support.

(2) Production of Ethylene-α-Olefin Copolymer

With using a continuous fluidized bed gas-phase polymerization apparatus, polymerization was conducted under conditions of a polymerization temperature of 87° C., a pressure of 2.0 MPaG, a molar ratio of hydrogen to ethylene of 0.8%, a molar ratio of 1-hexene to the sum of ethylene and 1-hexene of 0.7% with continuously charging ethylene, 1-hexene, and hydrogen gases to keep the above gas molar ratios during the polymerization. The pre-polymerization catalyst component mentioned above, triisobutylaluminum, and triethylamine (of which molar ratio to triisobutylaluminum was 0.5%) were also continuously charged to maintain an total amount of powder in the fluidized bed to be 80 kg; and the average polymerization time was 4 hours. The powder of ethylene-1-hexene copolymer obtained was pelletized with an extruder (LCM50 manufactured by KOBE STEEL, LTD.) under conditions of a feed rate of 50 kg/hr, a screw rotating speed of 450 rpm, a gate opening of 50%, a suction pressure of 0.1 MPa, and a resin temperature of 200 to 230° C., thereby an ethylene-1-hexene copolymer was obtained. The results of evaluating physical properties of the ethylene-1-hexene copolymer obtained are shown in Table 1.

(3) Film Molding

The ethylene-1-hexene copolymer obtained was molded to a blown film with 50μ thick under the same processing conditions as in Example 1(4). The results of evaluating physical properties of the film obtained are shown in Table 1.

Example 5

(1) Preparation of Pre-Polymerization Catalyst Component

After charging 80 liters of butane under an ambient temperature into a reactor having an interior volume of 210 liters equipped with an agitator under a nitrogen substitution atmosphere, putting 76.6 mmol of racemi-ethylenebis(1-indenyl)zirconium diphenoxide; and then raising an interior temperature of the reactor up to 50° C. to agitate for 2 hours. After decreasing the interior temperature of the reactor down to 30° C., charging 0.1 kg of ethylene and 0.7 liters of hydrogen in terms of an ambient temperature and pressure. Thereafter, putting 723 g of the co-catalyst support prepared with the same manner as in Example 3(1). After stabilizing the system in the reactor, putting 115 mmol of triisobutylaluminum to start polymerization. After commencement of polymerization, the pre-polymerization was carried out at temperatures inside the reactor as being 30° C. for the duration of initial 0.5 hours, being raised up to 50° C. for 30 minutes, and then being 50° C. This pre-polymerization was conducted for totally 4 hours while, during the duration of initial 0.5 hours, charging ethylene at a rate of 0.7 kg/hour and hydrogen gas at a rate of 0.7 liter/hour in terms of an ambient temperature and pressure; and after the 0.5 hours having passed, charging ethylene at a rate of 3.5 kg/hour and hydrogen gas at a rate of 10.5 liter/hour in terms of an ambient temperature and pressure. After completion of the polymerization, reducing the interior pressure of the reactor to 0.5 MPaG, transferring a pre-polymerization catalyst component in a slurry state to a dryer, followed by subjecting to drying under nitrogen circulation to obtain a pre-polymerization catalyst component.

An amount of pre-polymerized ethylene contained in the pre-polymerization catalyst component was 17.0 g per 1 g of the co-catalyst support.

(2) Production of Ethylene-α-Olefin Copolymer

With using a continuous fluidized bed gas-phase polymerization apparatus, polymerization was conducted under conditions of a polymerization temperature of 82° C., a pressure of 2.0 MPaG, a molar ratio of hydrogen to ethylene of 1.9%, a molar ratio of 1-hexene to the sum of ethylene and 1-hexene of 1.6% with continuously charging ethylene, 1-hexene, and hydrogen gases to keep the above gas molar ratios during the polymerization. The pre-polymerization catalyst component mentioned above, triisobutyl aluminum, and triethylamine (of which molar ratio to triisobutyl aluminum was 3%) were also continuously supplied to maintain an total amount of powder in the fluidized bed to be 80 kg; and the average polymerization time was 4 hours. The powder of ethylene-1-hexene copolymer obtained was pelletized with an extruder (LCM50 manufactured by KOBE STEEL, LTD.) under conditions of a feed rate of 50 kg/hr, a screw rotating speed of 450 rpm, a gate opening of 50%, a suction pressure of 0.1 MPa, and a resin temperature of 200 to 230° C., thereby an ethylene-1-hexene copolymer was obtained. The results of evaluating physical properties of the ethylene-1-hexene copolymer obtained are shown in Table 1.

(3) Film Molding

The ethylene-1-hexene copolymer obtained was molded to a blown film with 50 μm thick under the same processing conditions as in Example 1(4). The results of evaluating physical properties of the film obtained are shown in Table 1.

Comparative Example 1

(1) Preparation of Pre-Polymerization Catalyst Component

Putting 0.7 kg of the co-catalyst support (b) prepared in the step of Preparation of pre-polymerization catalyst component of Example 3(1) into an autoclave having an interior volume of 210 liters equipped with an agitator under a nitrogen substitution atmosphere, charging 3 liters (a volume in terms of an ambient temperature and pressure) of hydrogen and 80 liters of butane, and then heating the autoclave up to 30° C. Further charging ethylene in an amount corresponding to 0.03 MPa of the gas phase pressure in the autoclave; after stabilizing the system in the autoclave, putting 210 mmol of triisobutylaluminum and 70 mmol of racemi-ethylenebis(1-indenyl)zirconium diphenoxide to start polymerization. The pre-polymerization was conducted for totally 4 hours while raising the reaction temperature up to 31° C. along with continuously charging ethylene and hydrogen respectively at a rate of 0.4 kg/hour and a rate of 3.2 liter (a volume in terms of an ambient temperature and pressure)/hour; and after 30 minutes having passed, further raising the reaction temperature up to 51° C. along with continuously charging ethylene and hydrogen respectively at a rate of 2.8 kg/hour and a rate of 28 liter (a volume in terms of an ambient temperature and pressure)/hour. After completion of the polymerization, purging the residual ethylene, butane, and hydrogen gases, and then a solid left was dried under vacuum to obtain a pre-polymerization catalyst component in which 13 g of ethylene was pre-polymerized per 1 g of the co-catalyst support (a).

(2) Production of Ethylene-α-Olefin Copolymer

With using the pre-polymerization catalyst component obtained above, ethylene and 1-hexene were copolymerized with a continuous fluidized bed gas-phase polymerization apparatus in the same manner as in Example 1 except for changing the polymerization temperature to 75° C., the molar ratio of hydrogen to ethylene to 0.6%, and the molar ratio of 1-hexene to the sum of ethylene and 1-hexene to 1.5%; and then pelletizing in the same manner as in Example 1 to obtain an ethylene-1-hexene copolymer. The results of evaluating physical properties of the ethylene-1-hexene copolymer obtained are shown in Table 2.

(3) Film Molding

The ethylene-1-hexene copolymer obtained was molded to a blown film with 50μ thick under the same processing conditions as in Example 1(4). The results of evaluating physical properties of the film obtained are shown in Table 2.

Comparative Example 2

Commercial ethylene-1-hexene copolymer produced with a metallocene catalyst (manufactured by Evolue Japan Co., Ltd., commercially available from Sumitomo Chemical Co., Ltd., trade name SUMIKATHENE E FV405) was molded in a blown film with 50μ thick with a blown film molding device manufactured by Placo Co., Ltd. (a mono-axial extruder with a full flight type screw (diameter of 30 mmφ, L/D=28), dies (die diameter of 125 mmφ, lip gap of 2.0 mm), double slits airing) under conditions of a processing temperature of 170° C., an extrusion volume of 25 kg/hr, a frost line distance (FLD) of 200 mm, and a blowing ratio of 1.8. The results of evaluating physical properties of the ethylene-1-hexene copolymer employed and the film obtained are shown in Table 2.

TABLE 1

|  |  | Example 1 | Example 2 | Example 3 | Example 4 | Example 5 |
|---|---|---|---|---|---|---|
| Physical properties of polymer |  |  |  |  |  |  |
| Melt flow rate MFR | g/10 min. | 0.44 | 1.1 | 4.46 | 0.42 | 0.49 |
| Density d | Kg/m$^3$ | 919.8 | 920.0 | 919.8 | 924.7 | 913.6 |
| Activation energy of flow Ea | kJ/mol | 72 | 74 | 60 | 72 | 70 |
| Molecular weight distribution Mw/Mn | — | 8.9 | 8.3 | 16.4 | 12.0 | 7.6 |
| Maximum melting point Tm | °C. | 108.7 | 109.0 | 105.9 | 111.0 | 103 |
| Left-hand side of formula (1) |  | 106.4 | 106.5 | 105.4 | 108.7 | 101.2 |
| Right-hand side of formula (1) |  | 111.8 | 112.0 | 111.8 | 115.6 | 107.0 |
| The number of inflection points of melting curve | — | 2 | 2 | 2 | 2 | 2 |
| Melt flow rate ratio MFRR | — | 128 | 88 | 58.2 | 132.7 | 101.6 |
| Moldability |  |  |  |  |  |  |
| Resin pressure | MPa | 30 | 24 | 15 | 29 | 32 |
| Physical properties of film |  |  |  |  |  |  |
| Heat shrinking ratio |  |  |  |  |  |  |
| 115° C. | % | 19 | 13 | 27 | 5 | 49 |
| 118° C. |  | 28 | - | 39 | 19 | 55 |
| 120° C. |  | 41 | 38 | 48 | 34 | 59 |

TABLE 2

|  |  | Comparative Example 1 | Comparative Example 2 |
|---|---|---|---|
| Physical properties of polymer |  |  |  |
| Melt flow rate MFR | g/10 min | 0.46 | 3.88 |
| Density d | Kg/m$^3$ | 920.4 | 922.0 |
| Activation energy of flow Ea | kJ/mol | 73 | 29 |
| Molecular weight distribution Mw/Mn | — | 8.8 | 3.7 |
| Maximum melting point Tm | °C. | 105.2 | 117.5 |
| Left-hand side of formula (1) |  | 106.8 | 106.9 |
| Right-hand side of formula (1) |  | 112.3 | 113.6 |
| The number of inflection points of melting curve | — | 4 | 6 |
| Melt flow rate ratio MFRR | — | 131 | 16 |
| Moldability |  |  |  |
| Resin pressure | MPa | 29 | — |
| Physical properties of film |  |  |  |
| Heat shrinking ratio |  |  |  |
| 115° C. | % | 6 | 1 |
| 118° C. |  | 11 | 1 |
| 120° C. |  | 22 | 2 |

According to the present invention, an ethylene-α-olefin copolymer having a favorable moldability as well as being obtainable a molding having an excellent heat shrinkability, and a molding thereof are provided.

The invention claimed is:

1. An ethylene-α-olefin copolymer containing monomer units derived from ethylene and monomer units derived from an α-olefin having 4 to 20 carbon atoms, and having a density (d) of 890 to 970 kg/m$^3$, an activation energy of flow of 50 kJ/mol or more, a molecular weight distribution of 3 or more determined by a gel permeation chromatography, and the number of inflection points of 3 or less on a melting curve obtained by a differential scanning calorimetry within a temperatures range of from 25° C. to an end point of melting.

2. The ethylene-α-olefin copolymer according to claim 1, wherein a maximum melting point (Tm) of the copolymer determined by a differential scanning calorimetry and the density (d) satisfy a relation represented by the following formula (1):

$$0.675 \times d - 515.5 \leq Tm \leq 0.775 \times d - 601 \quad (1).$$

3. A molding produced by molding the ethylene-α-olefin copolymer according to claim 1.

4. A molding produced by molding the ethylene-α-olefin copolymer according to claim 2.

5. An ethylene-α-olefin copolymer containing monomer units derived from ethylene and monomer units derived from an α-olefin with carbon numbers of 4 to 20, and having a density of 890 to 970 kg/m³, an activation energy of flow of 50 kJ/mol or more and a molecular weight distribution of 3 or more determined by a gel permeation chromatography, wherein a maximum melting point (Tm) thereof determined by a differential scanning calorimetry and the density (d) satisfy a relation represented by the following formula (1):

$$0.675 \times d - 515.5 \leq Tm \leq 0.775 \times d - 601 \quad (1).$$

6. A molding produced by molding the ethylene-α-olefin copolymer according to claim 5.

* * * * *